United States Patent
Ma

(10) Patent No.: US 6,311,430 B1
(45) Date of Patent: Nov. 6, 2001

(54) APPARATUS FOR GROWING BEANSPROUTS

(76) Inventor: Kee Wai Ma, 74 Blewers Road morayfield, Queensland (AU)

( * ) Notice: Subject to any disclaimer, the term of this patent is extended or adjusted under 35 U.S.C. 154(b) by 0 days.

(21) Appl. No.: 08/716,414

(22) PCT Filed: Apr. 7, 1995

(86) PCT No.: PCT/AU95/00196

§ 371 Date: Oct. 10, 1997

§ 102(e) Date: Oct. 10, 1997

(87) PCT Pub. No.: WO95/27391

PCT Pub. Date: Oct. 19, 1995

(30) Foreign Application Priority Data

Apr. 11, 1994 (AU) .................................................. PM4926

(51) Int. Cl.[7] .................................................. A01G 31/06
(52) U.S. Cl. .................................................. 47/61
(58) Field of Search .................................. 47/59, 60, 61

(56) References Cited

U.S. PATENT DOCUMENTS

| | | | |
|---|---|---|---|
| 4,057,930 | * 11/1977 | Barham | 46/61 |
| 4,144,671 | * 3/1979 | Lee | 47/61 X |
| 4,289,614 | * 9/1981 | Suzuki | 47/61 X |
| 4,951,415 | * 8/1990 | Kawarabayashi et al. | 47/60 |
| 5,042,195 | * 8/1991 | Lee et al. | 47/61 |

FOREIGN PATENT DOCUMENTS

| | | |
|---|---|---|
| 08220617A | * 5/1985 | (FR) . |
| 08098632A | * 4/1996 | (JP) . |
| 08140478A | * 6/1996 | (JP) . |

\* cited by examiner

*Primary Examiner*—Peter M. Poon
*Assistant Examiner*—Jeffrey L. Gellner
(74) *Attorney, Agent, or Firm*—Thomas M. Freiburger

(57) ABSTRACT

An apparatus for growing beansprouts, comprising a plurality of containers (1, 2) for growing the sprouts therein mounted vertically one above the other extended above one end of a water tank (4) whereby the containers comprise movable plates (9, 10) to stabilize the seed bed, and movable bases (5, 6, 7, 8) at the bottom of each container, enabling its movable base to move from a position of closing the bottom to a position of opening the bottom, thereby allowing sprouts grown within the container to fall into the tank: where the tank having a means to convey the sprouts received from the containers end of the tank to the other end of the tank.

7 Claims, 3 Drawing Sheets

APPARATUS FOR GROWING BEANSPROUTS

BACKGROUND AND SUMMARY OF INVENTION

This invention relates in improvements of growing mung and soya bean sprouts and in the transportation from the growing room to the processing area in a highly efficient way.

The lack in good designed mung and soya sprouts growing system not only results in poor quality and low yields in produce but also increases the labour and space cost.

There have been some proposals being invented to cultivate seeds such as alfalfas and some vegetables effectively but it has proven non-effective to the cultivation of mung and soya sprouts. This is due to the difference in requirements to grow and in the aims to achieve.

The disadvantage of mung and soya sprouts cultivated by these proposed systems produces a green coloured, small sized and low yielded sprouts. These are an effect of the proposed common growth designs which allow the light to effect the growth, sprays water to wet the seeds, cultivation of thin layered sprouts, sloped water drainage setting and ample air circulation problems.

Another disadvantage is the increased labour cost due to the common structure design of multistacked containers, trays, multipallets and the fixed bottom walls of the containers, trays and pallets.

This design results in multiple times to lay the seeds, stackup and unstack containers, movement of trays and pallets in and out from the cabinet and growing room. After the growth of sprouts there are multiple times of cleaning each of the containers, tray, and pallet for re-use.

Furthermore it increases the cost of space due to the high density cultivation requirement of mung and soya sprouts where the previous proposed designs are for low density cultivation only which means a larger space area is required to meet the same production output than this present proposal.

These problems are overcome by the present invention which provides a super efficiency sprouts growing system specified for mung and soya beans only. This invention comprises two big cultivation containers for the seeds, fixed on a metal frame above a water conveyer tank in a fixed location inside a growing room.

In one form of this invention there consists a light stopping material to construct the container where the sprouts will not be affected by light to make it a green colour, but of a white colour. The size of the open top container are of equal width and height and is capable of growing over 400 kg of sprouts at a time.

With the open top container a designed quantity of seeds are easily loaded by a pump during seed loading and the loading of irrigation water from another outlet from a water pump during watering.

With the equal size width and height of the container a very thick layer of seeds during cultivation would further stop any light to effect the growing seeds, which also creates a high density moisture condition for maximum absorption by the seeds, therefore a better sized sprout and colour would be achieved during harvesting.

Due to the quality of this produce of bigger sized and a better colour of snowwhite, it would increase the production weight ratio from seeds to sprouts. At the same time it minimises the labour cost for multiple times of laying seeds in small containers, trays and pallets, stacking and unstacking containers, moving of trays into the cabin or moving pallets to the growing room of the previous proposals.

With the level setting of containers it allows a big volume of water from a fixed water outlet above the containers to flood the growing area to create the maximum absorption condition for the mung and soya beans growth requirements to achieve the maximum growth.

With the short setting between the two containers and the water conveyer tank there is a minimal circulation space, further achieving the condition of slow absorption of high density moisture to grow better sized sprouts.

Another formation of this container is the bottom wall is not a fixed wall but a releaseable wall. When it is closed it forms the bottom wall to support the weight of the seeds or sprouts during growing and also supports the weight of water during watering time. When it is released it forms an open space at the harvesting time allowing the sprouts to fall down to the water conveyer tank as the first stage in transporting the sprouts.

With the perforated holes smaller then seed size in the releaseable bottom wall in no designated location it forms the passage to drain the water from the top container to the bottom container, then drains out through the water conveyer tank during watering time.

There is a full size plate with holes smaller then seed size covering the top of the seed bed to assist the even growth and the stabilising condition of seeds during watering times, and also to reduce the light on the seed bed during opening and closing of the growing room door. The plate also reduces the rate of moisture evaporation from the sprouts further creating a better growing condition means a guarantee of the quality of produce.

In another form of this invention there is a water conveyer tank situated under the two containers that form a pool of water extending to the outside of the growing room for the retrieval of the sprouts. This is essential to this invention.

At the location under the containers, water pressure jets are mounted on the water conveyer tanks side walls in the direction whereby the sprouts would be propelled outside of the growing room.

The water pressure jets would of course be connected by pipe work to an electrical pump.

(May not be seen in drawing) When the water conveyer tank is filled with water and the pressure jets are activated by the pump, water movement is created towards the other end of the tank. The transportation of the sprouts from the location under the containers to the outside of the growing room is accomplished when the sprouts are dropped into the water conveyer tank and are carried by the water movement. The sprouts are then picked up by a conveyer belt and transported to the processing area.

The end result of this applied system is the further minimising in the cost of labour, preventing the necessities to unstack the containers and the moving of trays from the cabinet or moving the pallets from the growing room for the harvesting of sprouts as of previous proposals.

As you can see, a very limited requirement of space is required of this invention to achieve a large quantity of produce output.

This invention further maximises the usage of space per production ratio compared to the previous proposals requiring so much air space between the setting of the containers, trays and pallets and the space requirement of each individual container, trays and pallets to produce a low ratio of sprouts, but requiring a greater area of space.

DESCRIPTION OF PREFERRED EMBODIMENT

Figure 1:
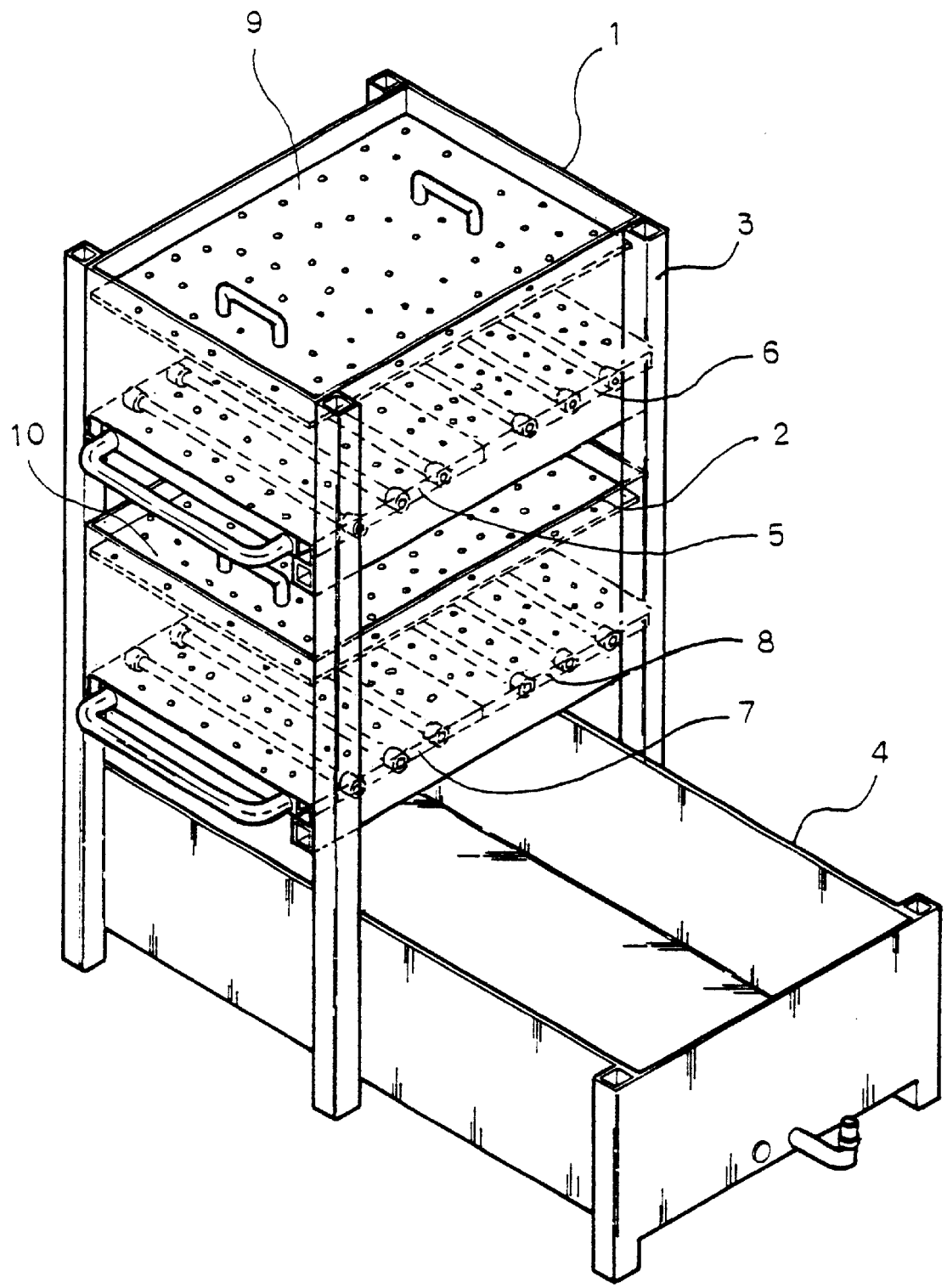
FIG. 1 is a perspective view showing a system according to the invention.

Referring to FIG. 1 it can be seen that the super efficiency sprouts growing system according to this invention complies two open top cultivation containers 1, 2 mounted on and supported by a metal frame 3 standing on the ground above an open top water conveyor tank 4 inside a growing room. The cultivation containers 1,2 now and hereafter are described as container, the water conveyor tank 4 as a tank and the releaseable bottom wall described as doors where two doors comprise a bottom wall.

At the time of seed loading into the container there is a seed loading outlet above the container 1 connected to a pipe work and a electrical flow pump to a bucket capable of holding a bag of 50 kg seed outside the growing room. (May not be seen in the drawing)

At first the top container 1 doors 5,6 are open and the lower container 2 doors are closed.

When the electrical flow pump for the seeds is switched on, within minutes a full bucket of seeds will be pumped into the lower container 2. The top container doors 5,6 are then closed. Repeating the process the full bucket of seeds will be loaded into the top container 1.

After the seed loading process, the perforated plates 9, 10 are placed on top of the seed bed in each container 1,2.

The watering time can be started accordingly.

During watering time the water is supplied to the watering outlet pipe (May not be seen in drawing) flowing straight down from above the top container 1.

First the water gets through the perforated plate 9 and is then able to flood above the seed bed or sprouts bed. Then the water is drained through the perforated door 5,6 down into the lower container 2 whereby the water is able to flood the seed bed or sprouts bed. At the end the passage of water is drained down and out through the outlet in the tank 4.

After a few days cultivation the seeds are grown into sprouts accordingly and are ready to be harvested.

First the lower container 2 doors 7,8 are opened. Because of the lack in support of the weight of the sprouts it falls down into the tank 4.

Because the tank 4 has been filled with water to a certain level and the electrical pump turned on the moving water is able to carry the sprouts from the location under the containers 1,2 to the outside of the growing room where the sprouts are then picked up by a conveyer belt and are transported for further processing.

Figure 2:
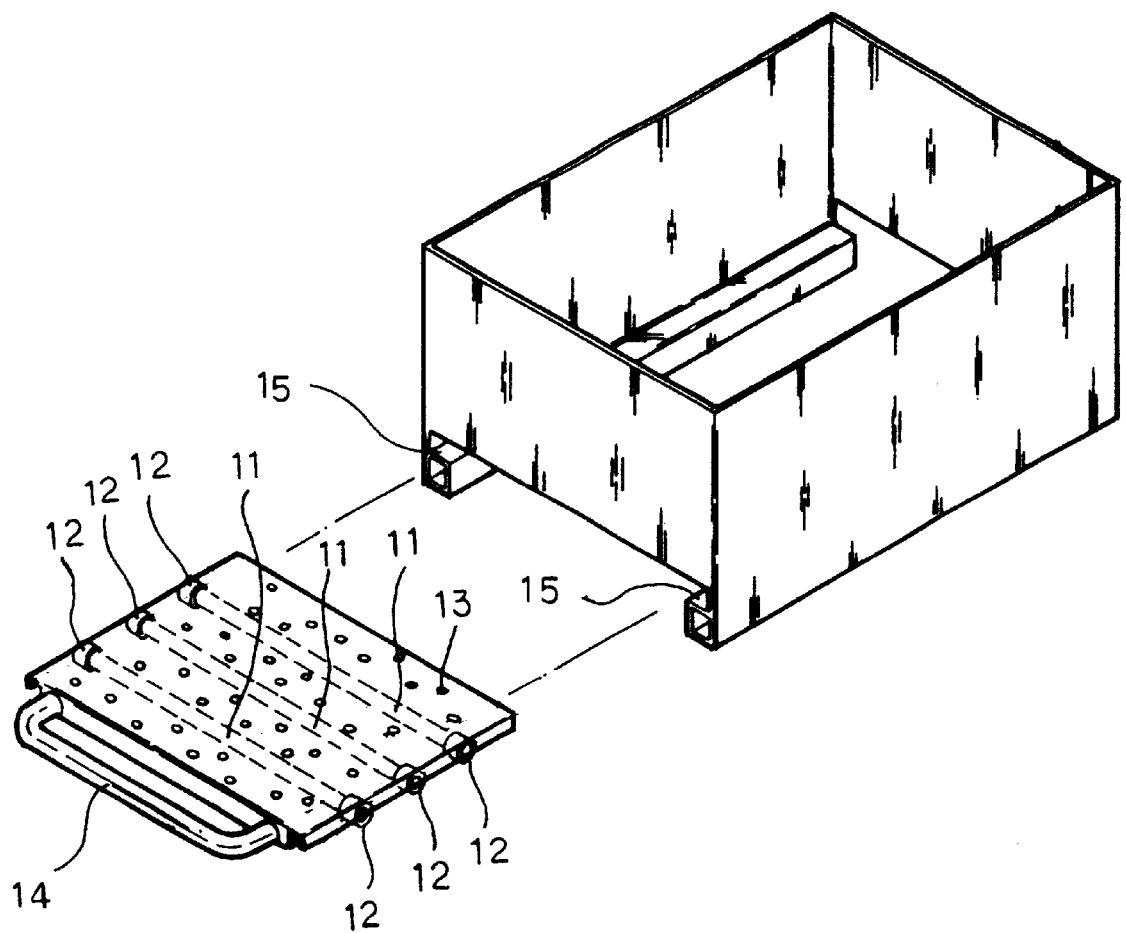
FIG. 2 shows the structure of a container included in the system.

Referring to FIG. 2 it can be seen that the container in the way of construction and how it works according to this invention.

There are three steel bars 11 mounted with wheels 12 on each side fixed under a perforated plate 13 with handles 14 to form one door level sitting on the bottom edges 15 of the container. Two of the doors are closed to form the bottom wall to support the seeds or the plants, and the irrigation of water and drainage during cultivation. When the two doors are pulled open, its purpose is to empty the sprouts relieving the door supports during harvesting.

Figure 3:
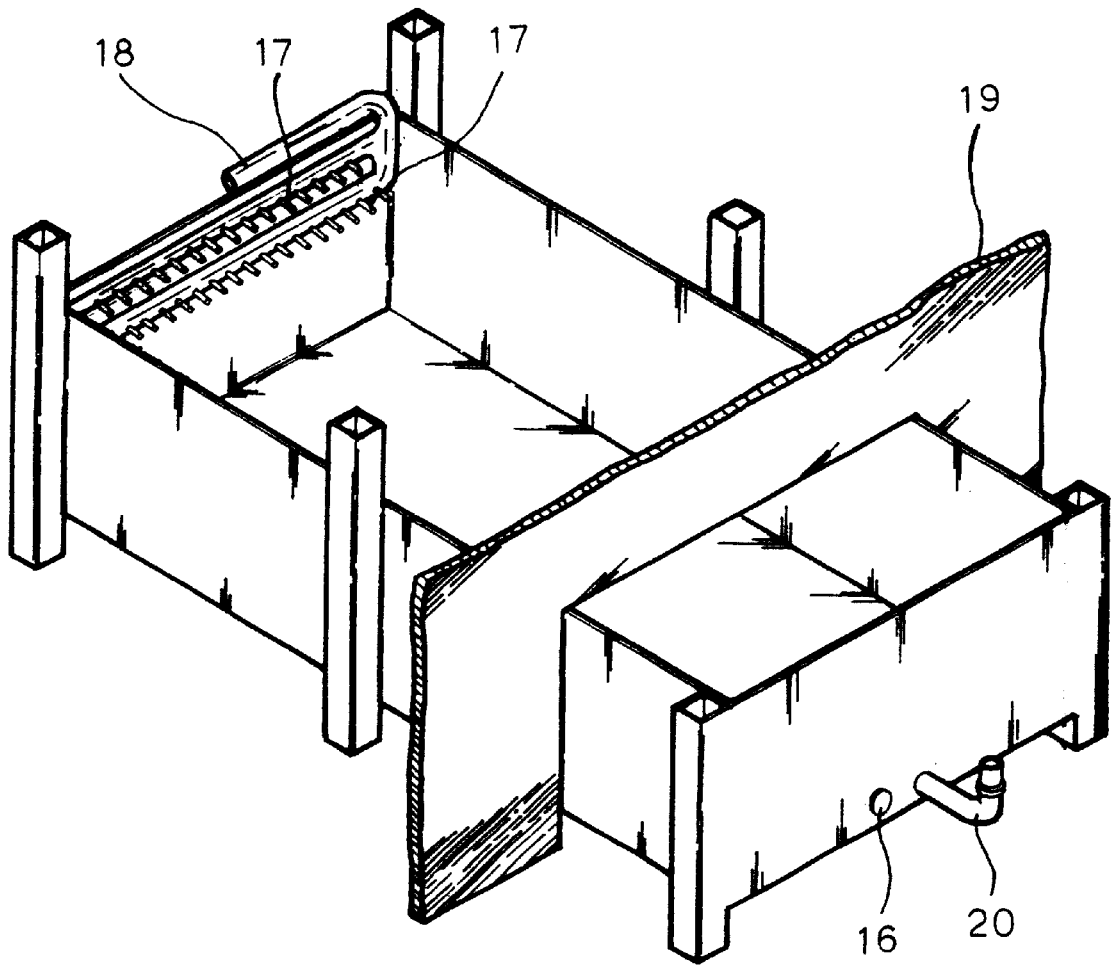
FIG. 3 shows a tank forming a part of the invention.

Referring to FIG. 3 it can also be seen of the tank in the way of construction and how it works according to this invention.

A plug is covered on to the drainage outlet 16 and filled with water. Water jets 17 are connected to the manifold 18 and mounted on one side of the wall of the tank under the containers facing in a direction spraying the sprouts to the outside of the growing room.

Within the room partition wall 19 in the extent of the tank a connected pipe work system to the pressure outlet of an electrical water pump (may not be seen in drawing) exists.

Also there is a suction outlet connected with pipe work to the water outlet 20 of the tank. When it is switched on the water is being sucked out from the tank outlet and then compressed out through the water jets creating a water movement which carries the fallen sprouts moving from under the containers location passing the room partition wall to the outside of the growing room.

The sprouts are then picked up for further processing.

The claims defining the invention are as follows:

1. An apparatus for growing beansprouts, comprising a plurality of containers for growing the sprouts mounted vertically one above the other, extending above one end of a water tank, wherein the containers comprise a moveable base at the bottom of each container, enabling the moveable base to move from a position of closing the bottom to a position of opening the bottom, thereby allowing sprouts grown within the container to fall into the tank, and wherein the tank has a means to convey the sprouts received from an end of the tank below the containers to and opposite end of the tank.

2. The apparatus as claimed in claim 1 wherein each movable base comprises two sliding doors.

3. The apparatus as claimed in claim 2 wherein each door is perforated with holes.

4. The apparatus as claimed in claim 3 wherein the hole size is smaller than mung or soya seed size.

5. The apparatus as claimed in claim 2 wherein each of the doors is supported by wheels.

6. The apparatus as claimed in claim 2 wherein each of the doors are attached with handles.

7. The apparatus as claimed in claim 1 wherein the means to convey the sprouts comprises water jets in a location under the containers in the water tank.

\* \* \* \* \*